United States Patent
Kajiya et al.

(10) Patent No.: US 8,791,618 B2
(45) Date of Patent: Jul. 29, 2014

(54) SQUIRREL-CAGE ROTOR FOR INDUCTION MOTOR

(75) Inventors: Takafumi Kajiya, Yamanashi (JP);
Hisashi Maeda, Yamanashi (JP);
Masamoto Fukuda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/400,860

(22) Filed: Feb. 21, 2012

(65) Prior Publication Data

US 2012/0217839 A1     Aug. 30, 2012

(30) Foreign Application Priority Data

Feb. 24, 2011 (JP) .................................. 2011-037981

(51) Int. Cl.
*H02K 17/16* (2006.01)

(52) U.S. Cl.
USPC ........................................................ 310/211

(58) Field of Classification Search
CPC ..... H02K 17/16; H02K 17/165; H02K 17/18; H02K 17/185
USPC ................................................. 310/211, 212
IPC ....................................... H02K 017/16, 017/18
See application file for complete search history.

(56) References Cited

U.S. PATENT DOCUMENTS

| | | | | |
|---|---|---|---|---|
| 1,936,244 A | * | 11/1933 | Bergstrom | 310/211 |
| 2,927,229 A | * | 3/1960 | Merrill | 310/162 |
| 5,467,521 A | * | 11/1995 | Nakamura et al. | 29/598 |
| 6,900,573 B2 | * | 5/2005 | Edwards et al. | 310/216.018 |
| 7,504,756 B2 | * | 3/2009 | Caprio et al. | 310/211 |
| 2007/0235170 A1 | * | 10/2007 | Zinck et al. | 165/133 |

FOREIGN PATENT DOCUMENTS

| | | | | |
|---|---|---|---|---|
| CN | 201178364 Y | | 1/2009 | |
| DE | 3421537 A1 | * | 12/1985 | ............. H02K 17/16 |
| DE | 42 22 187 C1 | | 5/1993 | |
| DE | 195 42 962 C1 | | 11/1996 | |
| DE | 102 30 006 A1 | | 1/2004 | |
| JP | 47033605 | | 12/1972 | |

(Continued)

OTHER PUBLICATIONS

Machine Translation, DE 19542962 C1, Nov. 28, 1996.*

(Continued)

*Primary Examiner* — Renee S Luebke
*Assistant Examiner* — Thomas Truong
(74) *Attorney, Agent, or Firm* — Lowe Hauptman & Ham, LLP

(57) ABSTRACT

A squirrel-cage rotor includes a rotor core formed having a plurality of slots, a plurality of conductor bars inserted into the slots respectively and made of copper or copper alloy, two conductor end rings joined to the plurality of conductor bars on both end faces of the rotor core and made of copper or copper alloy and a reinforcing-member end ring attached to at least one of the conductor end rings and made of material having a specific strength greater than that of either copper or copper alloy. The plurality of conductor bars are arranged so as to extend through the conductor end rings and the reinforcing-member end ring. Consequently, the rotor can be manufactured by any manufacturing method but die-casting. Further, the conductor end rings can be reinforced with an easily-obtainable material and additionally, the junction of conductor end rings can be easily viewed from an outside.

5 Claims, 2 Drawing Sheets

(56) References Cited

FOREIGN PATENT DOCUMENTS

| | | |
|---|---|---|
| JP | 2119557 A | 5/1990 |
| JP | 3261354 A | 11/1991 |
| JP | 5207714 A | 8/1993 |
| JP | 6022515 A | 1/1994 |
| JP | 10127022 A | 5/1998 |
| JP | 2838896 B2 | 12/1998 |
| JP | 2911315 B2 | 6/1999 |
| JP | 2011010498 A | 1/2011 |

OTHER PUBLICATIONS

Symonds et al., Strength of Materials, Section 5, p. 5-67.*
Machine Translation, Poklukar, DE 3421537 A1, Dec. 12, 1985.*
Office Action corresponding to JP2011-037981, dated May 8, 2012.
CN Office Action dated Mar. 5, 2013.
DE Office Action dated Mar. 11, 2013.

* cited by examiner

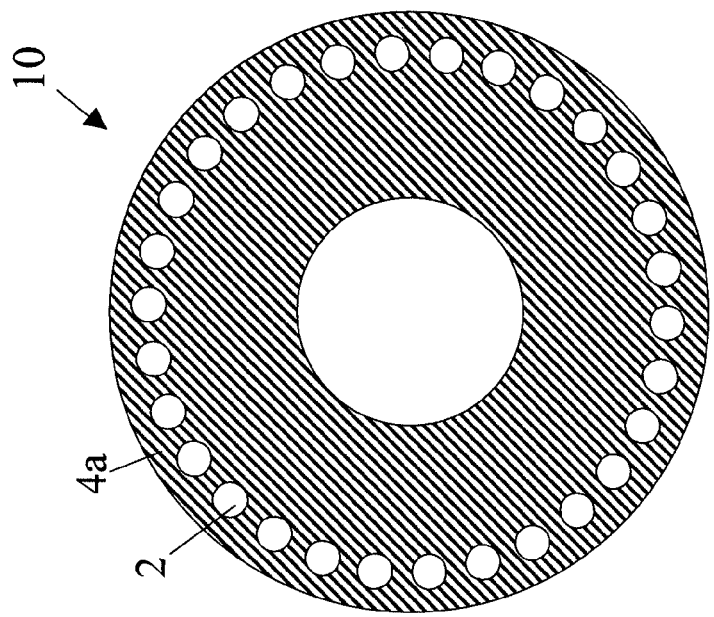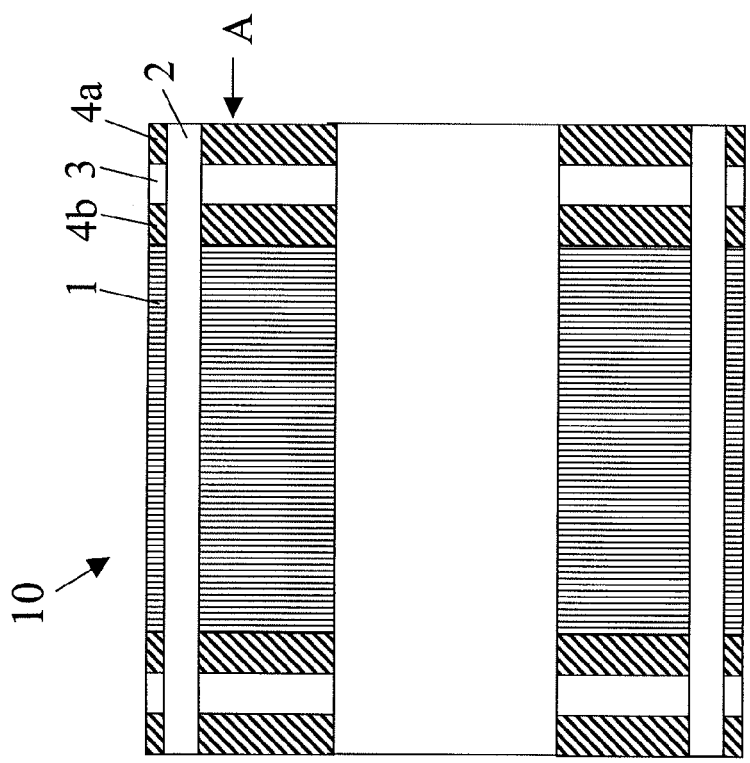

SQUIRREL-CAGE ROTOR FOR INDUCTION MOTOR

RELATED APPLICATIONS

The present application is based on, and claims priority from, Japanese Application No. 2011-037981, filed Feb. 24, 2011, the disclosure of which is hereby incorporated by reference herein in its entirety.

BACKGROUND OF THE INVENTION

1. Field of the Invention

The present invention relates to a squirrel-cage rotor for an induction motor.

2. Description of the Related Art

A squirrel-cage rotor for an induction motor mainly includes a rotor core, a plurality of bars inserted into slots in the rotor core and end rings joined to the bars at both end faces of the rotor core. In views of manufacturing cost and material cost, the plurality of bars and the end rings are frequently made of aluminum, in one body by die cast molding.

However, in recent years, an induction motor generating high power and low-calorific power has been required. For this purpose, a conductor part of the rotor of the induction motor may be made of metal of which resistance is lower than that of aluminum, for example, copper or copper alloy.

Additionally, it is required to speed up the operation of a motor. Nevertheless, since copper or copper alloy has a melting point higher than the melting point of aluminum, there is a possibility that the formation of a rotor's conductor part by die casting exerts an influence on magnetic steel sheets forming the rotor core. For this reason, it is difficult to adopt die-casting in forming the rotor's conductor part from metal, such as copper or copper alloy.

Therefore, when forming the rotor's conductor part using metal, such as copper or copper alloy, it is performed to manufacture a plurality of bars and end rings having a plurality of holes formed to receive these bars and continuously join the bars and the end rings by brazing etc. However, to produce an increase in temperature up to about 800° C. at brazing causes the metal to be annealed to lower its strength. Thus, there is a possibility that if rotating a motor containing the so-produced rotor at high speed, the holes of the end rings are deformed due to centrifugal force, causing the rotor to be damaged.

In prior art, therefore, attaching reinforcing members to the outside of the end rings is well known. For instance, Japanese Patent No. 2911315 discloses a technique of attaching a reinforcing member having a U-shaped cross section to an end face of the end ring. Additionally, there is proposed another technique of securing a reinforcing member (end ring holder) having a L-shaped cross section or a reinforcing ring to the end face of the end ring by welding, brazing or cold/hot isotropic pressing, etc., in Japanese Unexamined Patent Application Publication Nos. 10-127022 and 3-261354 and also Japanese Patent No. 2838896.

Additionally, Japanese Unexamined Patent Application Publication No. 2-119557 proposes a method of attaching a holding ring made from iron-based high strength material to the outside of the end ring and successively joining the former to the latter by arc welding or electron beam welding, etc., Further, Japanese Unexamined Patent Application Publication No. 2011-10498 discloses a technique of interposing an end plate, which is provided with slots each having an area larger than that of a magnetic steel sheet, between the end ring and the rotor core, so that a concentration of stress is alleviated to improve the reliability.

However, as the technique disclosed in Japanese Patent No. 2911315 assumes that the bars and the end rings are integrally formed in one body by "aluminum" die-casting, the technique of Japanese patent No. 2911315 cannot be employed in case of forming the bars and the end ring independently of each other. Japanese Unexamined Patent Application Publication Nos. 10-127022 and 3-261354 and also Japanese Patent No. 2838896 have a common problem that the junction condition between the bars and the end ring is cannot be easily seen from the outside.

Additionally, the method disclosed in Japanese Unexamined Patent Application Publication No. 2-119557 produces relatively-numerous junction points between the holding ring and the an end face of the end ring by arc welding or electron beam welding and furthermore, cans have to be removed finally. Therefore, the method in Japanese Unexamined Patent Application Publication No. 2-119557 accompanies an increased number of manufacturing steps to cause a manufacturing cost to increase. Further, if the area of each slot gets larger in Japanese Unexamined Patent Application Publication No. 2011-10498, then the reliability of the resultant rotor of Japanese Unexamined Patent Application Publication No. 2011-10498 is not always improved since a wall thickness between the slots and the outer diameter of the rotor is reduced.

Under such a situation, an object of the present invention is to provide a squirrel-cage rotor for an induction motor, which can be manufactured by any manufacturing method but die-casting and which allows end rings to be reinforced with use of easily-available material and also allows the junction condition between the bars and the end rings to be confirmed from the outside easily.

SUMMARY OF THE INVENTION

In order to achieve the above-mentioned object, according to a first mode of the present invention, there is provided a squirrel-cage rotor for an induction motor, comprising: a rotor core having a plurality of slots formed therein; a plurality of conductor bars inserted into the slots respectively and made of copper or copper alloy; two conductor end rings joined to the plurality of conductor bars on both end faces of the rotor core and made of copper or copper alloy; and a reinforcing-member end ring attached to at least one of the conductor end rings and made of material having a specific strength greater than that of either copper or copper alloy, wherein the plurality of conductor bars are arranged so as to extend through the conductor end rings and the reinforcing-member end ring.

According to a second mode of the invention, as in the first mode, the at least one of the conductor end rings is joined to two reinforcing-member end rings while being sandwiched therebetween.

According to a third mode of the invention, as in the first or the second mode, the conductor end ring and the reinforcing-member end ring are joined to each other by means of brazing.

According to a fourth mode of the invention, as in any one of the first to the third modes, the plurality of bars are shaped so as to generally accord with the slots, respectively.

According to a fifth mode of the invention, as in any one of the first to the fourth modes, the reinforcing-member end ring has a similar figure to the conductor end ring.

According to a sixth mode of the invention, as in any one of the first to the fifth modes, the reinforcing-member end ring is made from nonmagnetic iron-based material.

According to seventh mode of the invention, as in the sixth mode, the nonmagnetic iron-based material is stainless steel.

According to an eighth mode of the invention, as in any one of the first to the seventh modes, the reinforcing-member end ring is fastened to a rotating shaft.

These and other objectives, features and advantages of the present invention will become more apparent from the following description of typical embodiments of the present invention illustrated in the accompanied drawings.

BRIEF DESCRIPTION OF THE DRAWINGS

FIG. 1b is an end elevation view of the squirrel-cage rotor, viewed along an arrow A of FIG. 1a;

FIG. 2a is a sectional side view of a squirrel-cage rotor in accordance with a second embodiment of the present invention; and FIG. 2b is an end view of the squirrel-cage rotor, viewed along an arrow A of FIG. 2a.

DETAILED DESCRIPTION

Figure 1B:
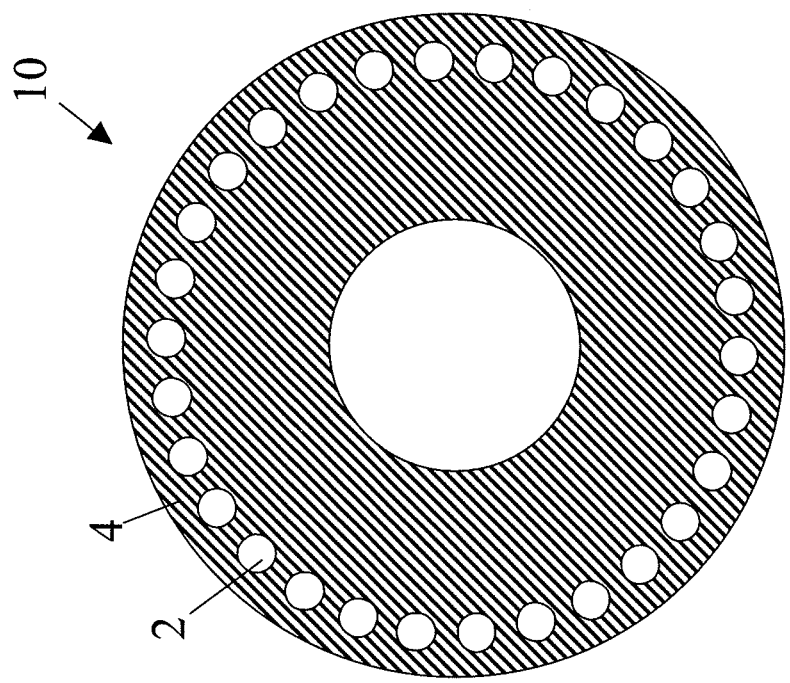

Embodiments of the present invention will be described with reference to accompanying drawings, below. In the following drawings, similar members are indicated with similar reference numerals, respectively. For ease of understanding, these drawings are illustrated by altering their reduction scales appropriately.

Figure 1A:
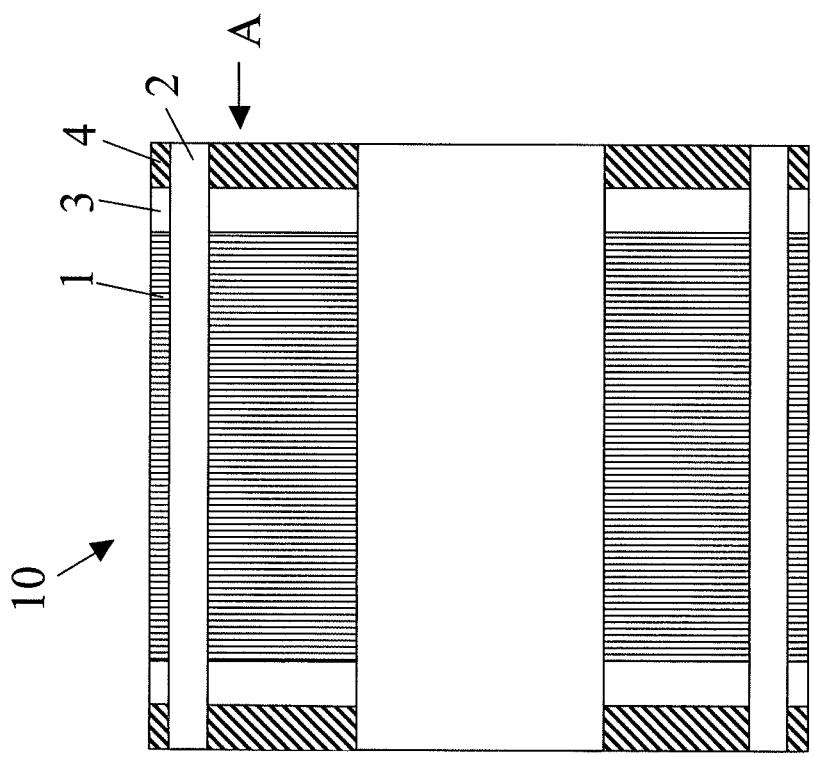
FIG. 1a is a sectional side view of a squirrel-cage rotor in accordance with a first embodiment of the present invention.

FIG. 1a is a sectional side view of a squirrel-cage rotor in accordance with the first embodiment of the present invention, while FIG. 1b is an end elevation view of the squirrel-cage rotor, viewed along an arrow A of FIG. 1a. The squirrel-cage rotor 10 shown in FIG. 1a comprises a rotor core 1. The rotor core 1 is formed by a normal material for a core of the squirrel-cage rotor 10, for example, a laminated body composed of magnetic steel sheets. The rotor core 1 has a plurality of slots (not shown) formed so as to extend in the axial direction thereof.

Conductor bars 2 made of copper or copper alloy are inserted into these slots, respectively. The conductor bars 2 have contours generally identical to the shapes of the slots, respectively. As shown in FIG. 1a, each of the conductor bars 2 is longer than the rotor core 1, so that both ends of each bar project from respective end faces of the rotor core 1, respectively.

As can be seen from FIG. 1b, according to one embodiment, thirty pieces of conductor bars 2 are arranged in the rotor. However, another number of conductor bars would be also included within the scope of the present invention.

Additionally, conductor end rings 3 (short-circuit rings) made of copper or copper alloy are arranged on both end faces of the rotor core 1, respectively. Both ends of each conductor bar 2 penetrate through holes (not shown) formed in the conductor end rings 3 and project therefrom. These conductor end rings 3 are respectively joined to all of the conductor bars 2, in the vicinity of each end of the conductor bars 2. Accordingly, the multiple conductor bars 3 and the conductor end rings 4 in pairs short-circuit each other.

Preferably, the conductor bars 2 and the conductor end rings 3 are joined to each other by means of brazing. Then, it is possible to manufacture the rotor 10 firmly. Note, the conductor bars 2 and the conductor end rings 3 may be joined to each other with use of the other technique, for example, welding.

In the present invention, it is not the case that the conductor bars 2 and the conductor end rings 3 are formed in one body by die-casting. In this way, as the conductor bars 2 and the conductive end rings 3, which are manufactured independently of each other, are joined to each other, it is possible to visually confirm the junction condition between the conductor bars 2 and the conductor end rings 3 at the time of manufacturing the rotor 10 of the present invention.

Furthermore, a reinforcing-member end ring 4 is arranged on an outside end face of at least one of the conductor end rings 3 (in case of FIG. 1a, respective outside end faces of both conductor end rings 3). The reinforcing-member end ring 4 is made from a material whose specific strength is greater than that of the conductor end ring 3. For instance, the reinforcing-member end ring is made from nonmagnetic iron-based material. Preferable material for the reinforcing-member end ring 4 is stainless steel.

In FIG. 1a, the cross section of the reinforcing-member end ring 4 is generally similar to the cross section of the conductor end ring 3 and also the cross section of the rotor core 1. The reinforcing-member end ring 4 is arranged in coaxial with the conductor end ring 3. Alternatively, the cross section of the reinforcing-member end ring 4 may have a similar figure to the cross section of the conductor end ring 3 and also the cross section of the rotor core 1. In such an arrangement, it is possible to prevent the conductor end rings 3, etc., from being deformed unequally even when the rotor is being rotated.

Then, both ends of each conductor bar 2 are inserted into corresponding holes (not shown) of the reinforcing-member end rings 4. As can be seen from FIGS. 1a and 1b, respective end faces of the conductor bars 2 are generally in the same planes with the reinforcing-member end rings 4. However, both ends of the conductor bar 2 may project from the reinforcing-member end rings 4. Similarly to the above description, it is assumed that the reinforcing-member end rings 4 are joined to the conductor end rings 3 by brazing or welding. Therefore, the junction condition among the conductor bars 2, the conductive end rings 3 and the reinforcing-member end rings 4 can be visually confirmed with ease at the time of manufacturing the rotor. Note, the reinforcing-member end rings 4 are fastened to a rotating shaft (not shown) by e.g. shrink fitting.

When the rotor 10 operates, the reinforcing-member end rings 4, each of which has a specific strength greater than that of the conductor end ring 3 and which is fastened to the rotating shaft (not shown), serve to support the conductor end rings 3 axially. Thus, it is possible to restrain circumferential deformations of the conductor end rings 3 due to their centrifugal forces. Therefore, it will be understood that a difference in the circumferential deformation amount between the conductor end rings 3 and the rotor core 1 can be eliminated according to the present invention. Thus, according to the present invention, it is possible to avoid a breakage of the rotor 10 even when it is rotated at high speed.

Additionally, as the reinforcing-member end rings 4 are formed from easily-available material, such as nonmagnetic iron-based material, it is possible to reinforce the end rings 3 with ease. It will be understood that if the reinforcing-member end rings 4 are made from stainless steel, then the deformations of the conductor end rings 3 can be suppressed near-certainly.

FIG. 2a is a sectional side view of a squirrel-cage rotor in accordance with the second embodiment of the present invention. FIG. 2b is an end view of the squirrel-cage rotor, viewed along an arrow A of FIG. 2A. As shown in these figures, the previous reinforcing-member end rings 4 are eliminated in the second embodiment. Instead, a first reinforcing-member end ring 4a is attached to an outside end face of the conductor end ring 3, while a second reinforcing-member end ring 4b is attached to an inner end face of the conductor end ring 3.

Thus, according to the second embodiment, the conductor end ring 3 is sandwiched, from both sides thereof, between the first reinforcing-member end ring 4a and the second reinforcing-member end ring 4b. As shown in FIG. 2b, the first reinforcing-member end ring 4a is positioned outside the conductor end ring 3, while the second reinforcing-member end ring 4b is brought into contact with the rotor core 1.

Further, as shown in FIG. 2a, the respective conductor bars 2 penetrate through corresponding holes (not shown) of both the second reinforcing-member end ring 4b and the conductor end ring 3 and reach up to an outside end of the first reinforcing-member end ring 4a. As can be seen from the figure, respective end faces of the conductor bars 2 are generally in the same planes with the first reinforcing-member end rings 4a. However, both ends of each conductor bar 2 may project from the first reinforcing-member end rings 4a.

In the second embodiment, the conductor end ring 3 is sandwiched between the reinforcing-member end rings 4 each having a great specific strength. Accordingly, the deformations of the conductor bars 3 in the circumferential direction during operating can be suppressed by the reinforcing-member end rings serving as not a cantilever but center impeller. Therefore, it will be understood that the circumferential deformations of the conductor bars 2 and the conductor end rings 3 due to centrifugal force can be suppressed in the second embodiment furthermore.

EFFECT OF THE INVENTION

In the first mode of the invention, at the time of manufacturing, it is possible to visually confirm the junction condition between the conductor bars and the conductive end ring with ease. Additionally, as the reinforcing-member end ring having a great specific strength holds the conductor end ring in the axial direction, the conductor end ring can be prevented from being deformed in the circumferential direction due to a centrifugal force. Thus, it is possible to eliminate a difference in the circumferential deformation amount between the conductor end ring and the rotor core.

In the second mode of the invention, as it is possible to hold the conductor end ring between the reinforcing-member end rings, the conductor end rings and the conductor bars can be prevented from being deformed in the circumferential direction due to centrifugal forces.

In the third and the fourth modes of the invention, it is possible to manufacture a rotor firmly.

In the fifth mode of the invention, it is possible to prevent the conductor end ring from being deformed unequally at the rotor's rotating.

In the sixth and the seventh modes of the invention, it is possible to suppress a deformation of the conductor end ring.

In the eighth mode of the invention, as the deformation of the conductor end ring can be suppressed furthermore, it is possible to improve the effects of the first to the seventh modes.

Although the present invention has been described with use of the typical embodiments, it will be understood by those skilled in the art that the previously-mentioned modification and a variety of other modifications, omissions and additions may be made without any departure from the scope of the present invention.

The invention claimed is:

1. A squirrel-cage rotor for an induction motor, comprising:
   a rotor core having a plurality of slots formed therein;
   a plurality of conductor bars inserted into the slots respectively and made of copper or copper alloy;
   two conductor end rings joined to the plurality of conductor bars on both end faces of the rotor core and made of copper or copper alloy; and
   two reinforcing-member end rings attached to at least one of the conductor end rings, sandwiching the conductor end ring therebetween and made of stainless steel having a specific strength greater than that of either copper or copper alloy,
   wherein the conductor end ring and the reinforcing-member end rings are joined to each other by means of brazing; and
   wherein the plurality of conductor bars are arranged so as to extend through the conductor end rings and the reinforcing-member end rings; and
   wherein one of the two reinforcing-member end rings makes contact with the rotor core.

2. The squirrel-cage rotor for an induction motor of claim 1, wherein
   the plurality of bars are shaped so as to generally accord with the slots, respectively.

3. The squirrel-cage rotor for an induction motor of claim 1, wherein
   each reinforcing-member end ring has a similarity figure to the conductor end ring.

4. The squirrel-cage rotor for an induction motor of claim 1, wherein
   each reinforcing-member end ring is fastened to a rotating shaft.

5. The squirrel-cage rotor for an induction motor of claim 1, wherein the two reinforcing-member end rings attached to at least one of the conductor end rings, sandwiching the conductor end ring therebetween are made of material having a specific strength greater than that of copper alloy.

* * * * *